3,098,832
PROCESS FOR EXPANDING POLYETHYLENE
Robert W. Pooley, Mishawaka, and Gerald L. Barnes, South Bend, Ind., assignors to United States Rubber Company, New York, N.Y., a corporation of New Jersey
No Drawing. Filed May 1, 1959, Ser. No. 810,253
7 Claims. (Cl. 260—2.5)

This invention relates to a novel method of producing expanded polyethylene on a commercial scale.

Expanded polyethylene cannot be obtained from expansion of linear polyethylene, which for the purpose of the present invention is generic to straight chain and branched chain polymers, by means of a blowing agent without a cross-linking treatment of the polymer. On the other hand, the polyethylene cannot be cross-linked before being blended with the blowing agent, because otherwise the materials cannot be mixed satisfactorily. It requires first that the linear polyethylene be blended with the blowing agent and then the polyethylene cross-linked with the blowing agent present.

One proposal for producing expanded polyethylene involves a two-step process. In the first step, the polyethylene containing the blowing agent is cross-linked without affecting the blowing agent; and in the second step, the cross-linked polymer containing the blowing agent is heated to decompose the latter and cause the polymer to expand. In small scale operations, the two-step procedure is satisfactory, but for large scale commercial operations in which large slabs of expanded polyethylene are to be produced, it is found that the product contains defects on account of excessive melting of polymer during the expansion treatment. This difficulty is serious enough to prevent large scale commercial production of expanded polyethylene, and thus, it was necessary to search for a practical solution to the problem.

Accordingly, an object of this invention is to provide a method of producing expanded polyethylene which lends itself to commercial application.

Another object is to provide a method of producing commercially an expanded polyethylene having uniform, fine cellular structure.

Other objects and advantages of this invention will become apparent from the following description and explanation thereof.

By means of the present invention, cross-linked polyethylene containing a decomposable rubber blowing agent is subjected to an elevated temperature under confined conditions such that the blowing agent is decomposed with an accompanying liberation of gaseous material without causing expansion of the polyethylene, the polyethylene is cooled within the confined zone thereby entrapping the gaseous material therein, and then heating the cooled polyethylene under conditions permitting the entrapped gas to cause the polyethylene to expand.

The polyethylene polymeric starting material is essentially linear and can be readily blended or mixed with the rubber blowing agent with or without an organic peroxide by which cross-linking of the polymer is achieved. In the case of employing chemical means for accomplishing cross-linking, the polymer containing the blowing agent and organic peroxide is heated under confined conditions to effect cross-linking and decomposition of the blowing agent in a single operation. Thereafter, the cross-linked polymer, confined within a zone in a manner to prevent expansion, is cooled so that the gases are trapped within the polymer. The polymer is removed from the confined zone and reheated to cause the gaseous material to expand the polymer. By another technique, only the blowing agent is blended with the linear polyethylene and cross-linking is achieved by ionizing radiation. Thereafter, the cross-linked polymer is placed in a zone where expansion is not possible and heated to decompose the blowing agent. The polymer is cooled to maintain the gaseous material trapped in the polymer while in the confined zone, and later reheated outside the confined zone to effect expansion of the polymer.

The linear polyethylene which is used as a starting material is solid and may vary in molecular weight from about 10,000 to 100,000. Preferably, the crystallinity of the polyethylene does not exceed about 90%, and this value applies to the total starting material obtained from a single material or from a blend of material of 100% crystallinity and material of lower crystallinity. The type of starting material may also be identified by its ASTM melt index, and in this regard, the material may have a melt index of about 0.2 to 10.

The polyethylene in the form of a sheet or powder is admixed or blended with the compounding ingredients by heating to a temperature at which the polyethylene is plastic or workable and then milling the same. The temperature to which the polyethylene is heated is below the point at which the blowing agent decomposes significantly. Generally, the polyethylene is heated above its melting point, which may be for example 220° F., but below the point at which the polyethylene becomes substantially fluid or sticky. In general, the upper working temperature may be about 240–260° F. After heating the polyethylene and compounding ingredients together, homogeneity may be obtained by treatment in a Banbury mixer, a 2–3 roll mill, a calender or the like. Mixing may also be accomplished by extrusion of a mixture of polyethylene and the compounding ingredients. The polyethylene containing the compounding ingredients may be shaped to whatever form is desired prior to the cross-linking treatment.

The cross-linking of the polyethylene starting material may be effected by any conventional treatment. One method involves the use of a cross-linking agent such as an organic peroxide. The organic peroxide is incorporated into the linear polyethylene during the step in which the rubber blowing agent is added. The organic peroxides include various classes such as the alkyl peroxides, aralkyl peroxides, etc. These compounds preferably have a half-life of more than 5 minutes at 275° F. and less than 1 hour at 375° F. Specific examples of cross-linking agents are tertiary-butyl-perbenzoate, ditertiarybutyl peroxide, dicumyl peroxide, etc. The amount of agent used in the cross-linking reaction has an effect on the pore size of the cellular structure of the expanded product. Generally, an increase in amount of cross-linking agent decreases the pore size of the expanded product. In general, it has been found that about 0.002 to 0.01 mol of cross-linking agent per 100 grams of polyethylene is suitable for the purpose of this invention. Above the given range, there is a tendency for the cross-linking agent to interfere with the expansion of the polyethylene, consequently less desirable results are achieved. A lower amount of agent than in the stated range may be employed, but also with less satisfactory results.

The cross-linking treatment with the use of the chemical agent is conducted at an elevated temperature of about 280° to 340° F. The period of time allowed for cross-linking varies considerably, depending upon such factors as temperature, concentration of cross-linking agent, and the amount of cross-linking desired. In general, about 6 to 45 minutes are provided for the cross-linking treatment.

Another method by which cross-linking can be achieved is through the use of high energy ionizing radiation, and in such case, the polyethylene already containing the blowing agent is subjected to the high energy ionizing radiation. Any form of high energy ionizing radiation is suitable, including particulate or X-ray radiation, such as for example, high speed electrons, protons, neutrons, alpha particles, beta rays, etc. Generally, the radiation that may be employed should be such that the individual particles or photons thereof possess energies of at least about 8 electron volts, usually for practical considerations about 100,000 to 10,000,000 electron volts, and the polyethylene is irradiated until at least about 2 watt hours per pound are absorbed, and the energy absorbed may vary as high as 20 watt hours per pound. Typical sources of ionizing radiation are electron accelerators of the Van de Graaff type, cobalt 60, nuclear reactors or the like.

The blowing agent contained in the polymer must be decomposed while the polymer is maintained under confining conditions to prevent any expansion of the polymer. This confined condition may be provided by a simple cavity mold positioned in the hydraulic press. When a chemical cross-linking agent is used, the decomposition of the blowing agent and cross-linking of the polymer occur at the same time, and for this purpose a temperature of about 280 to 340° F. is suitable, and for a period of about 5 to 60 minutes. On the other hand, when cross-linking is achieved by means of ionizing radiation, the decomposition step may be conducted in a confined zone at a temperature of about 280 to 340° F. and for a period of about 5 to 60 minutes. By any procedure, the blowing agent employed, which preferably decomposes with the liberation of gaseous material at a temperature of about 300° to 700° F., is a conventional rubber blowing agent, which as a class are readily known to those skilled in the art. Specific examples are dinitroso pentamethylene tetramine, sodium bicarbonate, azodicarbonemides, etc. The blowing agent is employed in amounts of about 1 to 15 parts per 100 parts of polyethylene material. The quantity of blowing agent may be varied still more, but less satisfactory results are achieved.

In the event it is desired to lower the temperature at which the blowing agent decomposes, a conventional activator may be employed for the purpose. The activator for the decomposition of the blowing agent is one which provides a suitable reduction in the decomposition temperature and has no adverse effect on the polyethylene. Specific examples of the activator are barium ricinoleate, tin methoxy maleate, Silene (precipitated hydrated calcium silicate), zinc oxide, lead acetate, zinc laurate, cadmium amyl phosphite, etc. Generally, the activator is used in an amount of about 1 to 125%, usually about 35 to 65%, based on the weight of the blowing agent.

The cross-linked polymer containing gaseous material is cooled to a temperature below about 150° F. and may be cooled down to ambient level before being removed from the confined zone. The polymer possesses sufficient strength at or below this temperature to maintain the gaseous material entrapped, thereby facilitating handling for the next step of the operation. The decomposition of blowing agent may be conducted by means of simple apparatus. The polymer occupies the entire space of the confined mold, thereby promoting good heat transfer, and even if the heat were applied unevenly, there is a tendency to achieve internal mixing of the polymer mass and hence promote uniform distribution of the gaseous material throughout the polymeric material.

After the cross-linked polymer containing gaseous material is hardened by cooling, it is ready for the expansion treatment. In the expansion treatment, the polymer may be placed in an open oven or in an oversized mold and heated to a temperature at which the polymer softens sufficiently to undergo expansion by the internal pressure generated by the gaseous material. For this purpose, a temperature of about 260 to 350° F. may be employed for a period of about 5 to 90 minutes.

The expanded polyethylene has a substantially uniform cellular structure, a density of not more than about 20 pounds per cubic foot, preferably about 2 to 10 pounds per cubic foot, with at least about 75% of the pores having a maximum dimension of not greater than about 1 mm., preferably not greater than 0.5 mm., and at least about 10%, preferably at least about 50 or 75% of the polymer being cross-linked, determined on the basis of the percent of polyethylene which is insoluble in toluene at 100° C. for a 24-hour period.

The closed cellular structure of fine pore size provides a pleasing appearance and is pleasant to the touch. The relatively low density of the product is an advantage because less polyethylene per unit volume is employed and this is accomplished with excellent improvement in insulation properties as shown by the thermal conductivity characteristics of the material. The closed structure of the product renders it especially suitable for use in contact with water, because it has relatively low absorptive power therefor. The expanded product has excellent dimensional stability at a temperature of about 195–200° F. as compared with expanded linear or branched polyethylene. The recovery of the present expanded product is significantly better than that of expanded linear or branched polyethylene, indicating that the present material is excellent for use as a weather-proofing material, padding for doors, soles for shoes, shock absorbers and many similar uses. Similarly, the wear resistance of the present product is significantly better than that of expanded linear or branched polyethylene. The resilience of the present material is also excellent.

The following example illustrates the method of the present invention.

*Example 1*

100 parts by weight of polyethylene having a density of 0.92 gm./cc. and 20–30% crystallinity were admixed with 2 parts of stearic acid, 5 parts of zinc oxide, 8 parts of azodicarbonamide, 2 parts of brown pigment and 3 parts of 40% dicumyl peroxide on a mill at a temperature of 250° F. for 10 minutes. 12 lbs. 12 oz. of the compounded polyethylene, after cooling, were charged to a picture frame mold, 24″ x 34″ x ½″, in a hydraulically operated press. After being closed, the press was heated for 20 minutes at 325° F. At the end of this period, the blowing agent was substantially completely decomposed and the polymer cross-linked. The press was cooled to 100° F. and the slab of polymer removed therefrom. The slab had the same size as the inside of the mold. The slab was then placed in a heated oven, and subjected to a temperature of 300° F. for 30 minutes, thereby causing the slab to expand to a finished size of 56″ x 85″ x 1¼″. The density of the finished product was 3.5 lbs./cu. ft.

By comparison with an expanded product obtained by the two-step process of first cross-linking and then expanding the polymer simultaneously with decomposition of the blowing agent, it is noted that the product of the present invention is uniform in cellular structure and is free of any defects which arise from the polymer melting during the expansion treatment.

Having thus provided a description of our invention along with a specific example thereof, the scope thereof is defined by the appended claims.

We claim:

1. A process which comprises subjecting polyethylene having not more than about 90% crystalline material and containing
    (1) a solid rubber blowing agent which decomposes with liberation of gas at a temperature of about 300° to 700° F. and
    (2) an effective amount of an organic peroxide having a half-life of more than 5 minutes at 275° F. and less than one hour at 375° F., while occupying the entire space in a confined zone where expansion is not possible, to a temperature at which the polyethylene becomes structurally transformed so that at least 10% of the polyethylene is insoluble when maintained in toluene at 100° C. for 24 hours and at which the blowing agent decomposes with liberation of gaseous material, cooling the confined polyethylene containing the gaseous material trapped therein, removing the cooled polyethylene from the confined zone and heating the cooled polyethylene to a temperature at which the entrapped gaseous material causes expansion of the polyethylene.

2. The process of claim 1 wherein the blowing agent is decomposed at a temperature of about 280° to 340° F.

3. The process of claim 1 wherein the cooled polyethylene is expanded by heating to a temperature of about 260° to 350° F.

4. The process of claim 1 wherein the rubber blowing agent is selected from the group consisting of dinitroso pentamethylene tetramine, sodium bicarbonate, and azodicarbonamide.

5. A process which comprises subjecting polyethylene having not more than about 90% crystalline material and containing, per 100 parts of polyethylene,
   (1) about 1 to 15 parts of a solid rubber blowing agent which decomposes with liberation of gas at a temperature of about 300° to 700° F. and
   (2) about .002 to .01 mol of an organic peroxide having a half-life of more than 5 minutes at 275° F. and less than one hour at 375° F.,
while occupying the entire space in a confined zone where expansion is not possible, to a temperature of about 280° to 340° F., thereby causing the polyethylene to become structurally transformed so that at least 50% of the polyethylene is insoluble when maintained in toluene at 100° C. for 24 hours and causing the blowing agent to decompose with liberation of gaseous material, cooling the confined polyethylene containing the gaseous material entrapped therein to a temperature below about 150° F., removing the cooled polyethylene from the confined zone, and heating the cooled polyethylene to a temperature of about 260° to 350° F. and thereby causing the entrapped gaseous material to expand the polyethylene.

6. The process of claim 5 wherein the organic peroxide is selected from the group consisting of dicumyl peroxide, tertiary-butyl perbenzoate and ditertiary-butyl peroxide.

7. The process of claim 5 wherein the rubber blowing agent is azodicarbonamide and the organic peroxide is dicumyl peroxide.

References Cited in the file of this patent
UNITED STATES PATENTS

| | | |
|---|---|---|
| 2,256,483 | Johnston | Sept. 23, 1941 |
| 2,525,965 | Smith | Oct. 17, 1950 |
| 2,528,523 | Kent | Nov. 7, 1950 |
| 2,628,945 | Wayne | Feb. 17, 1953 |
| 2,804,435 | Reed | Aug. 27, 1957 |
| 2,888,407 | Cooper et al. | May 2, 1959 |
| 2,888,424 | Precopio et al. | May 26, 1959 |
| 2,948,664 | Rubens et al. | Aug. 9, 1960 |